United States Patent [19]
Walles

[11] 3,993,811
[45] *Nov. 23, 1976

[54] THERMAL INSULATING PANEL FOR USE IN AN INSULATIVE CONTAINER AND METHOD OF MAKING SAID PANEL

[75] Inventor: Wilhelm E. Walles, Midland, Mich.

[73] Assignee: The Dow Chemical Company, Midland, Mich.

[*] Notice: The portion of the term of this patent subsequent to Nov. 25, 1992, has been disclaimed.

[22] Filed: Apr. 25, 1975

[21] Appl. No.: 571,451

Related U.S. Application Data

[63] Continuation-in-part of Ser. No. 497,588, Aug. 15, 1974, Pat. No. 3,921,844, which is a continuation-in-part of Ser. No. 305,451, Nov. 10, 1972, Pat. No. 3,828,960.

[52] U.S. Cl. .................................. 428/35; 428/357; 427/183; 427/304; 220/9 C; 215/13 R
[51] Int. Cl.² .......................... B32B 1/06; B32B 5/16; C23D 3/00; A47J 41/00
[58] Field of Search ............ 428/35, 357; 215/12 A, 215/13 R; 220/9 C, 9 D, 10; 427/183, 304

[56] References Cited
UNITED STATES PATENTS

| 1,071,817 | 9/1913 | Stanley | 215/13 R |
| 1,338,782 | 5/1920 | Lindahl | 215/13 R |
| 1,694,967 | 12/1928 | Coolidge | 215/13 R |
| 2,643,021 | 6/1953 | Freedman | 215/13 R X |

*Primary Examiner*—Philip Dier
*Attorney, Agent, or Firm*—R. B. Ledlie; M. S. Jenkins

[57] ABSTRACT

A panel having a double wall construction of a structural plastic material is provided with improved thermal insulative properties by (1) metallizing at least one surface of each wall of the panel with metal such as silver to provide a light reflective surface and to produce a partial barrier to atmospheric gases, (2) coating the metallized surface with a barrier plastic such as vinylidene chloride polymer, (3) evacuating the space enclosed by the walls of the panel, and (4) adding to the evacuated space a gas-absorbing material.

14 Claims, 1 Drawing Figure

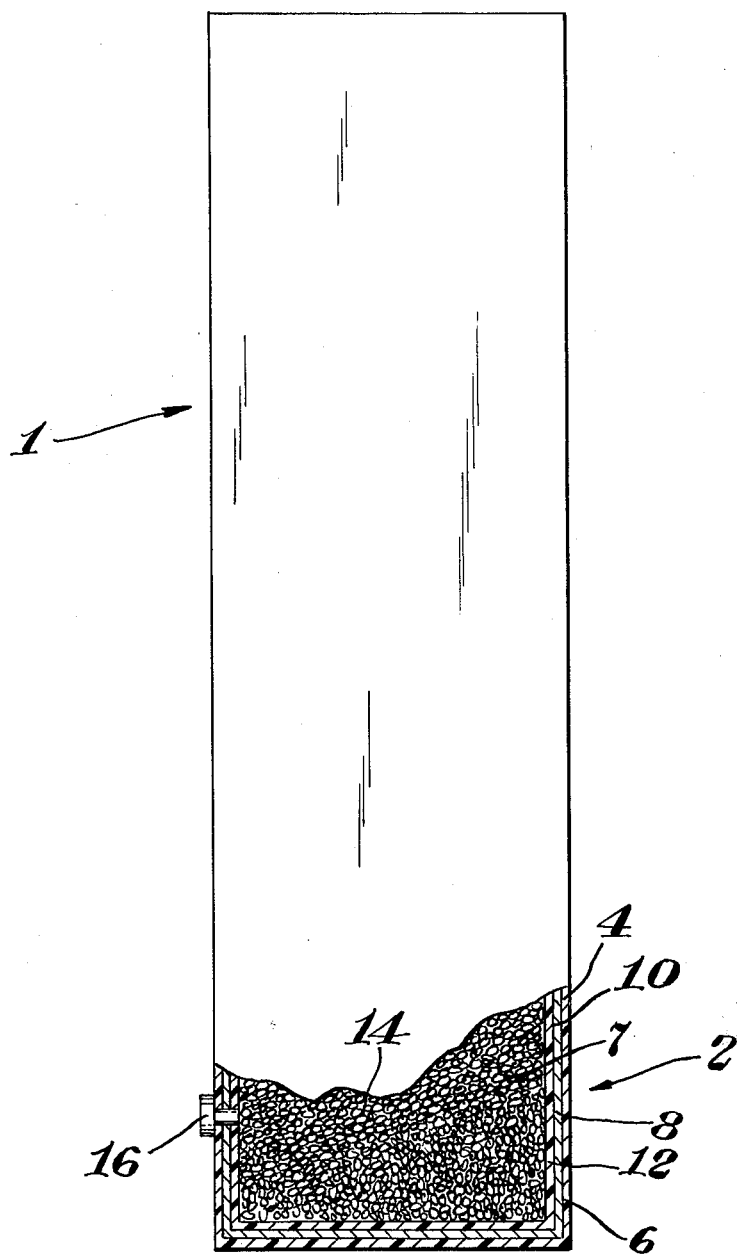

THERMAL INSULATING PANEL FOR USE IN AN INSULATIVE CONTAINER AND METHOD OF MAKING SAID PANEL

CROSS REFERENCE TO RELATED APPLICATION

This application is a continuation-in-part of Ser. No. 497,588 filed Aug. 15, 1974, now U.S. Pat. No. 3,921,844 which is a continuation-in-part of Ser. No. 305,451 filed Nov. 10, 1972, now U.S. Pat. No. 3,828,960.

BACKGROUND OF THE INVENTION

This invention relates to panels having vacuum retaining plastic walls and more particularly to containers having double wall construction of plastic materials with an evacuated space between the walls.

It is well known to form plastic insulating panels by foaming plastic materials such as polystyrene, polyethylene, etc. Such insulating panels are often employed as insulation for refrigerators, refrigerated trucks and rail cars, picnic coolers and the like.

In view of the unsolved problems of conventional insulation panels, it would be highly desirable to provide an economical plastic vacuum panel having substantial structural strength and long-lasting thermal insulative properties that are significantly better than those of foam plastic panels.

SUMMARY OF THE INVENTION

The present invention is a plastic panel having a double-wall construction capable of retaining a vacuum for long periods of time. The plastic panel exhibits considerable structural strength and excellent thermal insulative properties lasting up to 5 years and longer.

More specifically, the plastic panel comprises a boundary wall of a normally solid, plastic material enclosing an evacuated space, a layer of metal on at least one surface of said boundary wall, an overcoating of a barrier plastic adherent to the metal layer and a gas-absorbing material residing in the evacuated space. The plastic panel is provided by metallizing at least one surface of the boundary wall and coating the metallized surface with the barrier plastic. The enclosed space is subsequently evacuated and sealed to provide the desired vacuum panel. Advantageously, following evacuation and prior to sealing, the enclosed space is filled with a gas-absorbing material, e.g., a particulate solid.

Surprisingly, it is found that the plastic double wall panels of the present invention are superior in retaining the vacuum to similar panels in which the inner surface of the boundary wall has been metallized, but not coated with barrier plastic. Thus in the practice of this invention, it is essential that the barrier plastic be applied to the metallized surface if the desired vacuum is to be maintained. Even more surprising is that these plastic vacuum panels which have relatively thin walls can provide barrier to heat transfer which is many times greater than significantly thicker foam panels.

The plastic panels of the present invention are useful as in insulation in refrigerators, refrigerated trucks and rail cars, liquefied petroleum transport and storage vessels, picnic chests, insulation panels for buildings of all types, insulation jackets for power lines which are cooled with liquid nitrogen to reduce transmission losses. In addition, such panels can be employed in the manufacture of containers such as ice cream cartons, and mail containers for temperature sensitive materials.

BRIEF DESCRIPTION OF THE DRAWING

The drawing is an elevational view, partially in section, of a preferred plastic panel of the invention.

DETAILED DESCRIPTION OF THE EMBODIMENTS

In the drawing, there is depicted a preferred plastic panel 1 having a boundary wall 4 of a normally solid plastic material which encloses an evacuated space 7. On inner surface 6 of wall 4, there is deposited a light reflective metal layer 8. On surface 10 of the metal layer 8, there is deposited a layer 12 of a barrier polymer. The combined wall 4, metal layer 8 and barrier polymer layer 12 provide the exterior wall 2 of the panel. Occupying at least a portion of, preferably all of, space 7 is a gas-absorbing solid particulate 14 for capturing gases present in space 7 as a result of incomplete evacuation of space 7, gases resulting from outgassing of the plastic material and barrier polymer and gases which permeate the combined boundary wall 4, metal layer 8 and barrier polymer layer 12. A plug 16 stoppers the enclosed space 7 after evacuation. The plug 16 may be of any material suitable for stoppering holes in plastics such that a vacuum of at least $10^{-1}$ mm Hg is maintained.

Plastic materials suitable for use in the boundary wall are those normally solid, organic polymers that are readily shaped or molded or otherwise fabricated into the desired container form and possess sufficient rigidity to retain said form under conditions to which they will be exposed. Preferably, the polymers are thermoplastic and are relatively inert to those materials which are to be contained. Because of their lower cost and superior structural properties, polymers used in structural applications, so-called engineering plastics, such as polystyrene, styrene/acrylonitrile copolymers, styrene/butadiene copolymers, styrene/butadiene/acrylonitrile copolymers, rubber modified styrene polymers, and other polymers of monovinylidene aromatic carbocyclic monomers are generally preferred. Other polymers which may be suitably employed are acetal plastics such as polyformaldehyde resin, polyolefins such as polypropylene and polyethylene, polycarbonates, polyamides, such as nylon, rigid polyvinyl chloride, polyesters such as poly(ethylene terephthalate), acrylic resins such as poly(methyl methacrylate) and the other normally solid polymers which can be formed into the desired shape by conventional forming techniques, e.g., blow molding and injection molding. Of special interest, particularly for forming the portion of the boundary wall which will contain hot liquids, are the high temperature resistant plastics such as styrene/maleic anhydride copolymers, including their rubber modified variations, and other such polymers, including imide and lower N-alkyl imide forms. Such polymers of special interest are further described in U.S. Pat. No. 3,336,277 to Zimmerman et al, U.S. Pat. No. 3,401,153 to Zimmerman et al, U.S. Pat. No. 2,838,475 to Barrett and U.S. Pat. No. 2,971,939 to Baer. In addition to the foregoing polymers, the boundary wall may also contain one or more additaments such as fillers, stabilizers, surface modifiers, gas-absorbing materials, dyes and the like.

Because injection molding or similar procedures are preferred in fabricating the boundary wall, the plastic materials are preferably thermoplastic. However, thermosetting polymers can also be used. As a general rule, all synthetic polymers, whether thermoplastic or thermosetting, are incapable of retaining a high vacuum for an extended period. Accordingly, plastic materials usually employed in the boundary wall exhibit a degree of permeability to gases of the atmosphere such that a vacuum of $10^{-1}$ mm Hg cannot be maintained in containers fabricated solely of such plastic materials.

The boundary wall has thickness in the range of about 10 to about 300 mils preferably from about 20 to about 50 mils. The wall should be generally thicker within said range when polymers somewhat lower in high temperature resistance are employed. Therefore it is understood that the wall thickness is suitable if it provides the container with sufficient strength to withstand deformation under normal conditions of use. The boundary wall is formed into desired shape by conventional polymer shaping techniques such as injection molding, blow molding and combinations thereof. It is understood that the boundary wall may be formed by molding the wall in two or more parts and then welding the parts together. In such instances welded portions of wall may comprise different polymers. For example, the side of the wall to be exposed to the materials being held at constant temperature may be a resin having properties suitable for exposure to the material and the temperatures at which it is maintained. The other side which is to be exposed to conditions of weather, etc. may comprise a general purpose resin, such as styrene/acrylonitrile copyomer, that is capable of withstanding such conditions.

The metal coating which imparts partial barrier characteristic to the boundary wall suitably comprises silver, lead, nickel, aluminum, copper, gold, titanium, tin, bismuth, antimony, chromium, manganese, iron, cobalt, metals of the platinum group and allows of two more or more of the aforementioned metals. Preferably the metal coating comprises silver, nickel or alloy thereof.

Metallization is preferably carried out by first rendering the wall surface of the plastic water wettable and subsequently plating metal on the surface with an electroless process such as the processes described by F. A. Lowenheim in Metal Coating of Plastics, Noyes Data Corporation (1970). See also Pinner, S. H., et al, Plastics: Surface and Finish, Daniel Davey & Co., Inc., 172–186 (1971) and U.S. Pat. No. 2,464,143. Preferably, the wall surface is rendered water-wettable by a gas phase sulfonation process as described in U.S. Pat. No. 3,625,751 to Walles. It is understood, however, that other methods for rendering polymers water-wettable such as corona discharge, liquid phase sulfonation, etc., are also suitable. Other techniques for metallizing plastic surfaces such as electroplating can be suitably employed although such other techniques are not as desirable as the electroless plating techniques.

In especially preferred embodiments, a coating of tin ions is applied to the substrate plastic surface prior to deposition of one or more of the aforementioned preferred metals. If the tin coating is applied it is usually applied in amounts in the range from about 0.5 to about 50 micrograms/square centimeter. The tin coating is preferably applied by contacting the water-wettable surface of the plastic substrate with a dilute aqueous solution of a tin compound such as tin dichloride.

The quantity of metal deposited in forming the desired metal layer is that amount which forms an essentially continuous film over the desired surface of the boundary wall and thereby renders the wall partially impermeable. Preferably the quantity of metal deposited is in the range from about 1.0 to about 4000 micrograms per square centimeter ($\mu$/cm$^2$), especially from about 10 to about 500 $\mu$/cm$^2$). Corresponding thicknesses of the metal layer are about 0.00004 to about 0.16 mil, preferably about 0.0004 to about 0.02 mil. The metal layer should be essentially continuous and extensive enough such that the evacuated space is essentially enclosed by the metal layer. Suitably, the metal layer is applied to at least about 95 percent of the total area of the boundary wall surface proximate to the evacuated space (hereinafter referred to as the inner surface), preferably to at least 99 percent. It is understood that the metal layer is composed of metal crystals with some open spaces therebetween. Alternatively or in addition, the metal layer may be applied to the outer surface of the boundary wall, i.e., surface distant from the evacuated space, although such practice is not as preferred as applying the metal layer to the inner surface of the boundary wall.

For the purposes of this invention, a barrier plastic is a normally solid, organic polymer that exhibits a permeance to gases of the atmosphere of less than about 6 cubic centimeters/100 square inches/mil of thickness/-day (cc/100 square inches/mil/day) at one atmosphere of air, preferably less than about 0.9 cc/100 square inches/mil/day. The suitable barrier plastics can be formed into essentially continuous films which can be readily adhered to metal surfaces. Exemplary barrier plastics are vinylidene chloride/vinyl chloride copolymers, vinlidene chloride/acrylonitrile copolymers, and copolymers of such monomers as acrylonitrile, methacrylonitrile, methyl acrylate, methyl methacrylate and acrylamide. It is further understood that blends of such polymers are also suitable. Preferably the barrier plastics are the vinylidene chloride copolymers, especially those described in U.S. Pat. No. 3,617,368 to Gibbs et al.

The barrier plastics are preferably applied to the metal coatings in the form of latexes which form essentially continuous films upon drying at temperatures below the heat distortion point of the plastic material of the boundary wall. Heat distortion point of a polymer is the minimum temperature at which an article fabricated of the polymer distorts as a result of the tendency of the polymer to resume its prefabrication shape and/or as a result of minimal outside force. It is understood, however, that other forms of the barrier plastic such as solvent coatings, non-aqueous dispersions and powders are also suitably employed. Coating techniques such as dipping, spraying, powder coating, plasma jet and glow discharge and the like are suitable for applying the barrier plastic to the metal layer.

The quantity of the barrier plastic applied to the metal layer is in the range from about 6 to about 12000 $\mu$/cm$^2$, preferably from about 60 to about 5000 $\mu$/cm$^2$. Corresponding thicknesses of the coating of barrier plastic are in the range from about 0.001 to about 2.5 mils, preferably from about 0.01 to about 1 mil. The coating of barrier plastic should be extensive enough to essentially enclose the evacuated space. Advantageously, the barrier plastic coating is applied to at least about 95 percent of the total area of the metal layer, preferably at least about 99 percent.

A gas-absorbing material is added to the enclosed space prior to or after vacuumization of the space, preferably after evacuation. Usually, the gas-absorbing material is a finely divided solid or mixture of finely divided solids such as carbon black and activated charcoal powder, diatomaceous earch and other carbonaceous powders resulting from pyrolysis and/or steam activation of organic materials such as coconuts, corn husks, sugar; powdered metals and metal oxides and hydroxides, e.g., barium, lithium, sodium hydroxide, calcium oxide; metal silicates, calcium silicate, magnesium silicate, and finely divided, high surface area silicas. Generally porous powders of gas-absorbing solids having an average surface area of 100–2000 square meters per gram are desirable. Most advantageously, the powder has an average particle size in the range from about $10^{-2}$ to about 10 microns. The amount of powder employed usually ranges from very small quantities such as about 0.3 gram up to large quantities which substantially fill the volume of the enclosed space. In fact, it is desirable to overfill the enclosed space with the material by vibrating during the filling operation. Such overfilling enables the gas-absorbing material to add to the overall structural strength of the panel. After overfilling, the walls of the panel bulge at the center until atmospheric pressure is applied to the exterior surfaces thereof. The presence of such quantities of the gas-absorbing material prevents the walls of the panel from bowing inward as a result of the air pressure differential caused by the enclosed evacuated space. It is understood that the gas-absorbing solids of the aforementioned types capture atmospheric gases by both physical absorption and chemical absorption mechanisms. Also suitable as gas-absorbing solids are certain reactive materials such as the alkoxides of the alkali metal and alkaline earth metals, preferably the alkoxides having two or more carbon atoms, with the lithium alkoxides having 3–10 carbon atoms being especially preferred.

The space enclosed by the boundary wall is evacuated by any conventional vacuum pump such as one of a type used in evacuating conventional vacuum-insulated panels. As example of a preferred process for evacuating and filling the enclosed space is described in U.S. Pat. No. 3,824,762 to Walles. Most preferably the entire panel is enclosed in a partially evacuated chamber during the filling operation in order to overfill the enclosed space.

In one embodiment evacuation of the enclosed space is accomplished by purging the space with a reactive gas and then adding a material which will react with and thereby absorb the gas. For example, the alkoxides of lithium such as lithium isopropoxide are excellent absorbents for carbon dioxide. Other materials and gases can be as easily employed in the same manner provided that the reaction of the material and gas results in the elimination of gas from the system or the generation of a product or products which can be readily absorbed by another gas absorbing material such as activated carbon. Generation of high vacuum, being a prerequisite for a properly performing panel takes several hours or days when carried out in this manner. As one example of evacuation in this manner, the enclosed space is first purged with carbon dioxide and then filled with activated carbon and a small amount of lithium isopropoxide. The lithium isopropoxide reacts with carbon dioxide to liberate diisopropyl ether which is strongly absorbed by the activated carbon. Lithium isopropoxide not only absorbs and binds free carbon dioxide gas, but in addition carbon dioxide absorbed by carbon slowly desorbs, enters the gas phase and is also subsequently converted to lithium carbonate and diisopropyl ether. Lithium alkoxides having 2 or more carbon atoms, especially 3 to 10 carbon atoms are very effective because of the low atomic weight of lithium. Sodium, potassium, barium, calcium, magnesium and other alkali metal or alkaline earth metal alkoxides are operative as well, but require a larger weight to perform a similar function.

If the sealing or closing operation, described hereinafter, is to be carried out at one atmosphere, the lithium alkoxides are by far the most effective. If, however, a mild vacuum of 0.1 or 0.01 atmosphere is used during closing, the amount of alkoxide required to bring the vacuum down to the required $10^{-4}$ to $10^{-6}$ atm is so small that the alkoxides of the other aforementioned metals can be used almost as effectively.

Following addition of the gas-absorbing material to the enclosed space or evacuation of the enclosed space, whichever occurs later, the opening or openings through which the material is added and the vacuum is drawn are sealed such that a vacuum is retained (so-called hermetic seal). Conventional techniques for sealing vacuum containers fabricated of other materials can be adopted to seal the boundary wall. Preferably, however, a plug of a plastic material similar to or at least fusible with the plastic material of boundary wall is inserted into each opening and rotated until friction between the plug and the surfaces proximate to the opening fuses the plug to the boundary wall and thereby forms a hermetic seal. Alternatively, the plug may be sealed into the opening using an adhesive such as an epoxy resin.

The following examples are given for purposes of illustrating the invention and should not be construed as limiting its scope. All parts and percentages are by weight unless otherwise indicated.

EXAMPLE 1

MOLDING AND SURFACE TREATMENT

Acrylonitrile/butadiene/styrene terpolymer (24/33/42) is molded by molding into a boundary wall as depicted in the drawing. The boundary wall of the panel has a thickness of .032 cm. The panel has dimensions of 1 m. × 1 m. × 1 cm. The inner surface of the boundary wall, i.e., that surface which borders or is proximate to the enclosed space, is surface sulfonated to a degree of one microgram of sulfur trioxide equivalents per square centimeter by passing dry air containing 2% sulfur trioxide gas into the enclosed space at 25° C for a period of a minute.

METALLIZATION

A metallizing bath is prepared by mixing one part of each of the following solutions:
0.60% $Ag(NH_3)_2NO_3$ in water
0.30% NaOH in water 0.15% glucose and 0.15% fructose in water Immediately after the bath is prepared, the boundary wall is dipped into the bath and metallization is completed within one minute.

APPLICATION OF BARRIER PLASTIC

The metallized boundary wall is overcoated with a barrier plastic by dipping it into a 50% solids latex of vinyl chloride/acrylonitrile/sulfoethyl methacrylate (90/8/2) terpolymer, said latex having an average particle size of about 0.22 micron. Thereafter, the boundary wall is removed from the latex and excess latex is allowed to run off the boundary wall. The boundary wall is then dried at 60° C for 15 minutes.

EVACUATION AND ADDITION OF GAS-ABSORBING PARTICULATE

The space enclosed by the boundary wall is evacuated to a pressure of $10^{-2}$ mm Hg, and 80 g pf activated charcoal having an average particle size of 0.2 micron is added to the enclosed space under vacuum. Piror to addition to the enclosed space, the charcoal is placed under a vacuum for a period of 48 hours at $10^{-7}$ mm Hg. In filling the enclosed space with the powder, additional powder is added to the enclosed space by vibrating the panel during the powder loading step. Vibration is accomplished by a mechanical means. Following addition of the powder to the enclosed space, the enclosed space is sealed hermetically by inserting a plug of styrene/acrylonitrile (75/25) copolymer into the opening into the enclosed space while maintaining the vacuum and spin welding the plug to the boundary wall to form the desired plastic container having double walls retaining the vacuum. Preferably, a portion of the plug surface is metallized and/or coated with barrier plastic to provide the boundary wall with a continuous barrier layer. The vacuum insulated panel is tested and is found to have heat insulative properties more than 1.5 times a 1 m. × 1 m. × 30 cm. of polystyrene foam slab. In addition, the panel weighs less than 70 percent of the slab weight and bears more than ten times the maximum load borne by the slab.

As an example of the significant advantages of containers employing such panels, such a container will maintain a gallon of ice cream frozen for five days at room temperature without refrigeration. For purposes of comparison, a gallon of ice cream remains frozen for only 23 minutes in a paper carton and 12 hours in a box fabricated of 1 inch thick polystyrene foam.

EXAMPLE 2

As Example 1, but with the silvering recipe modified as follows:
contact sulfonated surface with 0.003% $SnCl_2$ in water,
rinse with water, and
add a freshly mixed solution in water, prepared by combining:
1.3% $Ag^{++}$ as $Ag(NH_3)_2NO_3$ with excess $NH_3$ 3%
2-hydrazino ethanol.

In this case the $Sn^{++}$ is chemically bound on and in the surface layer of the plastic by the $-SO_3-$ groups. It catalyses the formation of $Ag^°$ on and in the plastic surface.

Silver deposited this way can visually be distinguished as having a purplish-black color when viewed from the outside surface through clear plastic towards the surface layer.

When seen from the enclosed space through the air toward the silver layer it appears as highly glossy metallic silver. The Sn catalyst also serves to greatly reduce the amount of silver used, as most is deposited on the surface rather than in the bulk of the solution.

EXAMPLE 3

As evidence of the synergistic effect of overcoating metal layer with the barrier plastic, several strips of polystyrene film (thickness = 5 mils) are surface sulfonated using the conditions described in Example 1 to provide a degree of sulfonation of 1.5 microgram of sulfur trioxide equivalents per $cm^2$ of film. Three strips of the surface sulfonated film are coated with varying thicknesses of the barrier plastic by applying a 50% solids latex of vinylidene chloride/acrylonitrile/sulfoethyl methacrylate (90/8/2) terpolymer using various Meyer rods. The polystyrene strips coated with the different thicknesses of the barrier plastic, a strip of untreated polystyrene film and a strip of surface sulfonated polystyrene film are tested for oxygen permeance and the results in rate of oxygen transmission are recorded in Table 11.

Two sulfontated strips of polystyrene film are metallized in accordance with the metallization procedure of Example 1. One metallized strip is overcoated with barrier plastic by the procedure of the foregoing paragraph. The resulting coated metallized strip and the uncoated metallized strip are tested for oxygen permeance and the results in rate of oxygen transmission are recorded in Table II.

TABLE II

| Sample No. | Type | Coating $\mu g/cm^2$ | Thickness (mil) (1) | Oxygen Transmission Rate, cc/100 sq in/day/atm | |
|---|---|---|---|---|---|
| | | | | Measured (2) | Calculated (3) |
| 1 | Silver | 220 | (0.01) | 0.013 | 0.24 |
| | Barrier Plastic | 1200 | (0.22) | | |
| 2* | Silver | 220 | (0.01) | 6.3 | 6.3 |
| 3* | Barrier Plastic | 710 | (0.13) | 0.43 | 0.43 |
| 4* | Barrier Plastic | 980 | (0.18) | 0.31 | 0.31 |
| 5* | Barrier Plastic | 1420 | (0.26) | 0.20 | 0.21 |
| 6* | None, Surface Sulfonated | — | — | 25.0 | 25.2 |
| 7* | None, Untreated | — | — | 25.2 | 25.2 |

*Not an example of the invention.

(1) Coating thickness is measured in micrograms ($\mu g$)/square centimeter ($cm^2$) from which thickness in mils is calculated using the equation:

Thickness (mils) = 393.7 mils/cm · $\frac{weight (\mu g)}{Density [\mu g/cm^3 \times area (cm^2)]}$ The densities for the layers of materials are as follows:
silver = 10.5 $g/cm^3$ and barrier plastic = 1 $g/cm^3$.

(2) Determined by using a mass spectrometer to measure premeated oxygen at 20° C for 24 hours.

(3) Calculated using $\frac{1}{Q} = \Sigma \frac{dn}{Pn}$ wherein $Q$ is the permeance of the total film structure to the named gas is

TABLE II-continued

| Sample No. | Type | Coating μg/cm² | Thickness (mil) (1) | Oxygen Transmission Rate, cc/100 sq in/day/atm | |
|---|---|---|---|---|---|
| | | | | Measured (2) | Calculated (3) | cc/100 sq. in./day/atm, Pn is the permeability of a one mil layer in that film and dn is the thickness of the layer in mils.
For example, in Sample No. 1, $\frac{1}{Q} = \frac{5}{125} + \frac{0.01}{0.083} + \frac{0.22}{0.056} = 0.24$
where permeability of the layers is as follows: $P_{Boundary\ wall} = 125$, $P_{silver} = 0.083$, and $P_{Barrier\ Plastic} = 0.056$.
Permeabilities of the various layers are measured by mass spectrometry.

As shown by Samples Nos. 3–5; the additivity rule of
$1/Q = \Sigma\ dn/Pn$
is confirmed. Surprisingly, however, permeance for Sample No. 1 does not conform to the additivity rule since measured oxygen permeance of 0.013 cc/100 sq. in./day/atm is 1/18 of the calculated oxygen permeance of 0.24 cc/100 sq. in./day/atm.

EXAMPLE 4

A plastic vacuum panel is constructed following the procedure of Example 1 except that the enclosed space is purged with $CO_2$, filled with 17.3 grams of activated carbon and 2.4 grams of lithium isopropoxide, and then sealed. In 20 minutes, a vacuum of $10^{-1}$ atmospheres is achieved. After 3 days, the vacuum has dropped to below $10^{-1}$ atmospheres. The resulting panel has thermal insulative properties comparable to those of the panel of Example 1.

What is claimed is:

1. A plastic panel having double wall construction capable of retaining a vacuum for a substantial period of time, said panel comprising a boundary wall of a normally solid, plastic material enclosing an evacuated space, a layer of metal on at least one surface of said boundary wall, an overcoating of a barrier plastic adherent to the metal layer and a gas-absorbing material residing in the evacuated space.

2. The panel of claim 1 wherein the enclosed spaced is overfilled with gas-absorbing material.

3. The plastic panel of claim 1 wherein the metal layer is on the surface of the boundary wall which is most proximate to the evacuated space.

4. The plastic panel of claim 1 wherein the barrier plastic exhibits a permeance to gases of the atmosphere of less than about 0.9 cc/100 sq. in./mil/day.

5. The plastic panel of claim 4 wherein the barrier plastic is a vinylidene chloride copolymer.

6. The plastic panel of claim 1 wherein the metal is silver.

7. The plastic panel of claim 1 wherein the thickness of the boundary wall is in the range from about 40 to about 300 mils, the thickness of the metal layer is in the range from about 0.0001 to about 0.5 mil and the thickness of the overcoating is in the range from about 0.001 to about 2.5 mils.

8. The plastic panel of claim 1 wherein the gas-absorbing material comprises activated charcoal in the form of a particulate solid.

9. The plastic panel according to claim 1 wherein the plastic material of the boundary wall is a polymer of a monovinylidene aromatic carbocyclic monomer.

10. The plastic panel of claim 1 wherein at least a portion of the gas-absorbing material is an alkali metal alkoxide having from 2 to 12 carbon atoms.

11. The plastic panel of claim 10 wherein the alkoxide is an alkoxide of lithium having 3 to 10 carbon atoms.

12. A method for making the plastic panel of claim 2 comprising the steps of rendering a surface of the boundary wall water wettable, depositing a layer of tin upon the water wettable surface, depositing a metal on the tin surface to form an essentially continuous layer thereof, applying the barrier plastic in the form of a latex to the resulting metal layer to form an essentially continuous layer of the barrier plastic adherent to the metal layer, evacuating the enclosed space, overfilling the enclosed space with a gas-absorbing material by vibrating the panel during the filling of the enclosed space and hermetically sealing the evacuated space from the atmosphere.

13. The method of claim 12 wherein the amount of tin deposited is in the range from about 0.5 to about 50 micrograms/square centimeter.

14. The plastic panel of claim 1 as a component part of a thermal insulative container.

* * * * *

UNITED STATES PATENT AND TRADEMARK OFFICE
CERTIFICATE OF CORRECTION

PATENT NO. : 3,993,811
DATED : November 23, 1976
INVENTOR(S) : Wilhelm E. Walles It is certified that error appears in the above-identified patent and that said Letters Patent are hereby corrected as shown below:

Column 3, line 31, "copyomer" should read --copolymer--;

Column 3, line 37 "allows" should read --alloys--;

Column 3, line 38, delete the first "more";

Column 4, line 5, "($\mu/cm^2$)" should read --($\mu g/cm^2$)--;

Column 4, line 6, "$\mu/cm^2$)" should read --$\mu g/cm^2$--;

Column 4, line 33, "vinlidene" should read --vinylidene--;

Column 4, line 58, in both occurrences, "$\mu/cm^2$" should read --$\mu g/cm^2$--;

Column 5, line 4, "earch" should read --earth--;

Column 5, line 31, "absorption" should read --adsorption--;

Column 5, line 59, after "panel" insert a comma --,--;

Column 6, line 45, ".032" should read --.32--;

Column 6, line 55, delete "of" at the end of the line;

Column 6, line 58, starting with "0.15%", start a new paragraph;

Column 6, line 59, starting with "Immediately" start a new paragraph;

Column 7, line 8, "pf" should read --of--;

UNITED STATES PATENT AND TRADEMARK OFFICE
CERTIFICATE OF CORRECTION

PATENT NO. : 3,993,811  
DATED : November 23, 1976  
INVENTOR(S) : Wilhelm E. Walles Page 2 of 2

It is certified that error appears in the above-identified patent and that said Letters Patent are hereby corrected as shown below:

Column 7, line 10, "Piror" should read --Prior--;

Column 8, line 4, starting with "3%", start a new paragraph;

Column 8, line 35, "ll" should read --II--;

Column 8, line 36, "sulfontated" should read --sulfonated--;

Column 8, Table II, in the headings, the third and fourth headings and columns should be together to form one, e.g., Coating Thickness µg/cm$^2$ (mil) (1);

Column 8, Table II, footnote (2), line 1, "premeated" should read --permeated--;

Column 8, Table II, footnote (2), line 2, "20°C" should read --25°C--;

Column 8, Table II, footnote (3), line 2, "is" should read --in--.

Signed and Sealed this

First Day of March 1977

[SEAL]

Attest:

RUTH C. MASON  
Attesting Officer

C. MARSHALL DANN  
Commissioner of Patents and Trademarks